United States Patent [19]

Schulz

[11] Patent Number: 4,905,102

[45] Date of Patent: Feb. 27, 1990

[54] SYSTEM FOR PROCESSING SIGNALS REPRODUCED FROM A DIGITAL MAGNETIC RECORD IN A RECORDER-REPRODUCER

[75] Inventor: Axel Schulz, Bickenbach, Fed. Rep. of Germany

[73] Assignee: Robert Bosch GmbH, Stuttgart, Fed. Rep. of Germany

[21] Appl. No.: 229,132

[22] Filed: Aug. 5, 1988

[30] Foreign Application Priority Data

Aug. 7, 1987 [DE] Fed. Rep. of Germany ....... 3726316

[51] Int. Cl.$^4$ .............................................. G11B 5/09
[52] U.S. Cl. ...................................................... 360/46
[58] Field of Search ............... 360/46, 67, 51; 375/20, 375/110

[56] References Cited

U.S. PATENT DOCUMENTS

| | | |
|---|---|---|
| 3,252,098 | 5/1966 | Schlaepfer ............................ 360/67 |
| 3,846,829 | 11/1974 | Lin ........................................ 360/46 |
| 4,495,528 | 1/1985 | Sasamura et al. ..................... 360/46 |
| 4,564,870 | 1/1986 | Kitamura .............................. 360/67 |
| 4,626,933 | 12/1986 | Bucska et al. ......................... 360/46 |
| 4,729,045 | 3/1988 | Baugh ................................... 360/46 |

OTHER PUBLICATIONS

"NHK Technical Monograph" No. 31, Mar. 1982, p. 20, FIG. 4.5.

Primary Examiner—Vincent P. Canney
Attorney, Agent, or Firm—Frishauf, Holtz, Goodman & Woodward

[57] ABSTRACT

A distorted signal available at the output of a preamplifier which are derived from a magnetically recorded digital signal is differentiated twice. The second derivative signal obtained by that double differentiation is used to derive one set of pulses corresponding to both positive and negative peaks of the twice differented signal, which are then used to clock a D-flipflop. Another set of pulses is derived from the double differentiated signal responding to peaks of only one polarity thereof and these are applied to the D input of the flipflop. The output of the flipflop is a reconstituted replica of the digital signal that was originally recorded.

3 Claims, 3 Drawing Sheets

SYSTEM FOR PROCESSING SIGNALS REPRODUCED FROM A DIGITAL MAGNETIC RECORD IN A RECORDER-REPRODUCER

The invention concerns a system for processing signals in a digital recording and reproducing apparatus in which a digital signal written on a magnetic carrier is reconstituted from the signal picked up by the reproducing transducer.

The reproducing transducer usually delivers a distorted digital signal from a magnetic record. A distortion eliminating apparatus for a digital video signals read from a magnetic tape is known from an article in the periodical "NHK TECHNICAL MONOGRAPH" No. 31, March 1982, page 20, FIG. 4.5, which consists of a combination of separate RC and cosine equalizers. At the output of such a cosine equalizer a voltage threshold circuit is usually connected which reshapes the equalized signal at a suitable logic level for the particular family of logic circuits (ECL, TTL) of the circuits that follow. Such combinations of equalizer circuits have the disadvantage that at high data rate, e.g. 80 Mbit/s, and at low signal to noise ratios unambiguous voltage thresholds must be derived for the voltage threshold circuit that corresponds to half of the voltage amplitude of the equalized digital signal.

In order to provide a sufficient margin against noise disturbance, the voltage threshold must follow the equalized signal with a short time constant. Since on the other hand magnetic recording and reproduction rates constitute a band-limited transmission system, contradictory requirements are involved in the derivation of voltage thresholds in the reproduction of low frequency signal components.

SUMMARY OF THE INVENTION

It is an object of the present invention to provide a system for reproducing signals from a digital record in which the distorted signals reproduced from the record can be unambiguously converted into a digital signal.

Briefly, the signal read out from the carrier is differentiated twice to obtain a second derivative signal, which is then subjected to detection of positive and negative components of the second derivative signal. A clocking signal is produced from the detected signals and then a circuit including a D-flipflop is used which is connected for response to the clocking signal and also to either the positive or the negative detected component signal.

The system of the invention has the advantage that the distortion removal is no longer done by a broadband equalizer and is therefore simpler to implement and to operate. At the same time a logic-true binary signal is directly derived. The invention makes use of the recognition that the data information in the reproduced signal is fully included in the higher frequency signal components of a twice differentiated transducer output signal. A supplementary voltage threshold circuit for deriving logic levels becomes unnecessary and can be omitted. The equalizing of the reproduced signal can be carried out on a narrow band basis.

The particularities of the implementation of the invention can be better understood in connection with an illustrated description that follows.

BRIEF DESCRIPTION OF THE DRAWINGS

The invention is further described by way of illustrative example with reference to the annex drawings, in which.

DESCRIPTION OF THE ILLUSTRATED EMBODIMENTS

Figure 1:
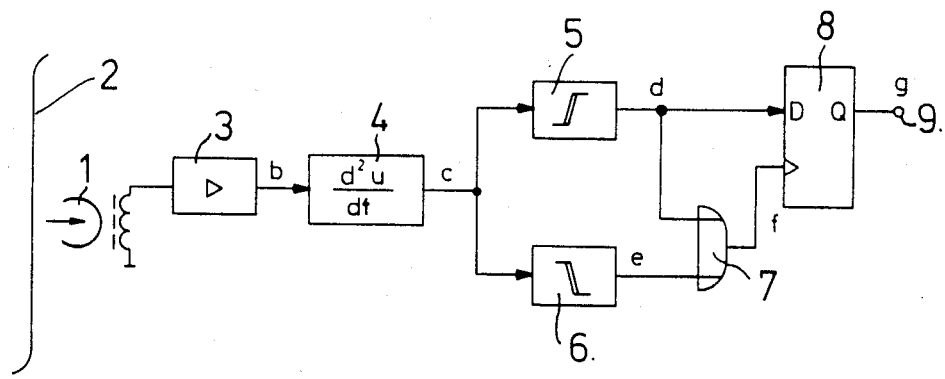
FIG. 1 is a circuit block diagram of a first embodiment of a system according to the invention.

The circuit block diagram of FIG. 1 shows the signal reproduction path of a digital recording and reproducing magnetic tape equipment. Magnetic tape 2 is read with a reproducing head 1. The voltages induced in the reproducing head 1 in the course of the read-out process are first amplified in a preamplifier 3 and then supplied to the input of a second order differentiating amplifier 4. The output of the differentiating amplifier 4 is connected to the input of a first comparator 5 for detecting positive signal components and to the input of a second comparator 6 for detecting negative signal components. The signals detected by means of the comparators 5 and 6 are supplied to the respective inputs of an OR gate 7 and thereby supplied together to the clock input of a D-flipflop 8. The D input of the D-flipflop 8 is connected with the output of the first comparator 5. A digital signal corresponding to the reproduced signal with removal of distortion is made available at an output 9 of the D-flipflop 8.

Figure 3:
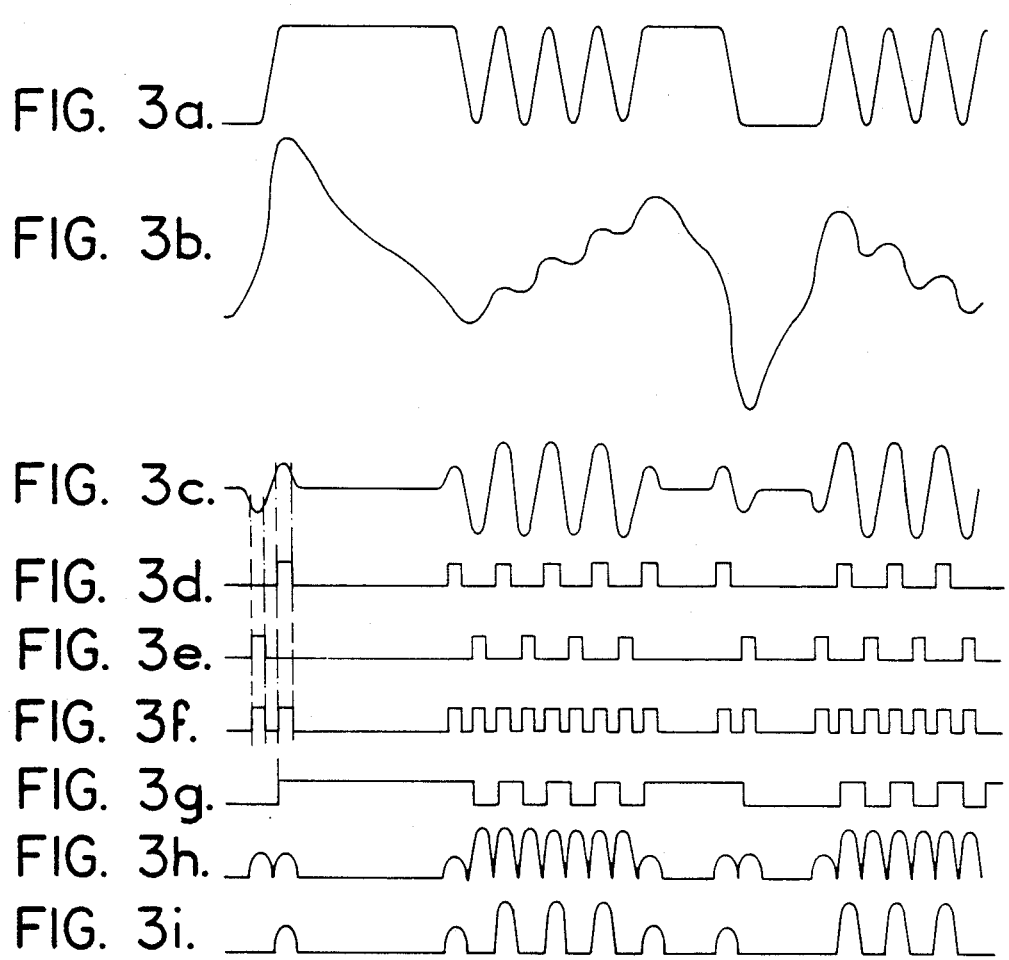
FIGS. 3a, 3b, 3c, 3d, 3e, 3f, 3g, 3h and 3i are graphs on the same time scale, showing voltage plotted against time for signals appearing various places in the circuits illustrated in FIG. 1 and FIG. 2.
Figure 4:
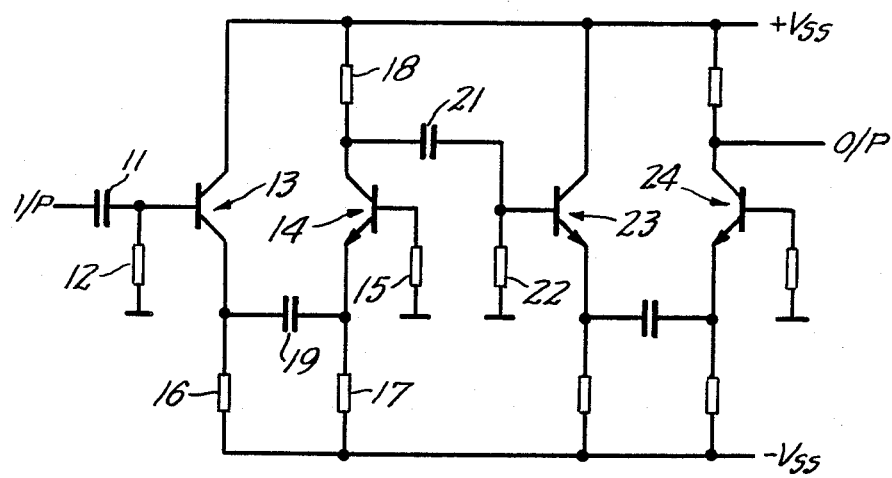
FIG. 4 is a circuit of a second order differentiating amplifier suitable for use in the circuits of FIGS. 1 and 2.

The manner of operation of the circuit shown in FIG. 1 will now be explained with reference to the voltage-time diagrams of FIGS. 3a, 3b . . . . For this purpose it may be assumed that a recording signal which previously flowed in the winding of a recording head (not shown) had the time-course illustrated in FIG. 3a. As a result of the bandpass characteristic of the magnetic transmission system, there appears, from such a recorded signal, at output of the preamplifier 3 a signal such as is shown in FIG. 3b. After the signal 3b has been differentiated twice in the differentiating amplifier 4 the signal shown in FIG. 3c is derived. Differentiating amplifiers are in themselves known and the choice of a particular differentiating amplifier is not a part of this invention. A kind of differentiating amplifier preferred at the present time for this purpose is illustrated in FIG. 4.

When the positive levels of the signal illustrated in FIG. 3c exceed a predetermined level, the comparator 5 generates the binary signal shown in FIG. 3d. In other words, as shown in FIG. 3d, comparator 5 operates as a comparator switch Correspondingly, the comparator 6 generates a signal according to FIG. 3e when a predetermined negative voltage level is exceeded in a negative direction. In other words, as shown in FIG. 3e, the comparator 6 also operates as a comparator switch The signals shown respectively in FIG. 3d and 3e are combined in an OR gate 5, producing at the output of that gate the binary signal of FIG. 3f. This signal serves as the clocking signal with which the binary signal present at the output of the comparator 5 is interrogated with regard to its logic level. The logic level thus sampled is held in the D-flipflop 8 until the the next clocking pulse arrives. A digital signal according to FIG. 3g then is produced at the output of the D-flipflop 8 and is furnished to the terminal 9. This digital signal corresponds to the above assumed recording current in the recording head during the recording operation. The D-flipflop 8 acts as a binary "sample and hold" circuit.

Figure 2:
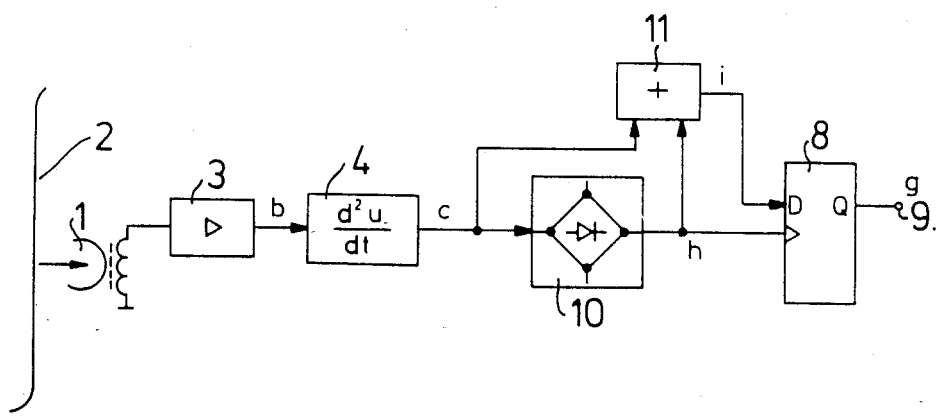
FIG. 2 is a circuit block diagram of a second embodiment of a system according to the invention.

The circuit block diagram of FIG. 2 shows a second embodiment of the system of the invention. Circuit blocks performing the same function are designated with the same reference numerals both in FIG. 1 and in FIG. 2. As in the case of the circuit of FIG. 1, a signal read by the reproducing head 1 from the magnetic tape 2 is amplified in the preamplifier 3 and twice differentiated in the differentiating amplifier 4. The signal obtainable at the output of the differentiating amplifier is then supplied to a full wave rectifier 10 and is also supplied to an addition stage 11. Another input of the addition stage 11 is connected to the output of the full wave (frequency doubling) rectifier 10 and that output is also supplied to the clock input of the D-flipflop 8. The signal obtainable at the output of the addition stage 11 is supplied to the D-input of the D-flipflop 8. A reproduced signal in digital form freed of distortion is available at the output of the D-flipflop 8, which is then made to appear at the output terminal 9.

The signal of the form shown in FIG. 3h is produced by the full wave rectification in the full wave rectifier stage 10. A signal according to FIG. 3i is made available to the output of the addition stage 11 as the result of the addition in that stage. The signal of FIG. 3h is subjected to pulse shaping a conventional way, by means not shown, so that it may be used as a clock signal for transmission of the data of the signal illustrated in FIG. 3i. Such pulse shaping, for example, can be done by amplitude limiting followed by differentiation. At the output of the D-flipflop 8, and therefore also at the output terminal 9, a digital signal of the form shown in FIG. 3g is produced which corresponds to the digital signal that was used for recording.

FIG. 4 shows a preferred circuit for the second-order differentiating amplifier 4 of FIGS. 1 and 2. In the preferred circuit a first differenting amplifier is built around the transistors 13 and 14. The resistors 12 and 15, respectively connected between ground potential and the bases of the transistors serve to determine the operating points of the transistors. The emitters of the transistor 13 and 14 are respectively connected by the resistors 16 and 17 to a negative operating voltage source $-v_{ss}$. The collector of transistor 13 is connected directly to a positive operating voltage source $+v_{22}$, to which the collector of transistor 14 is connected through a collector resistance 18. Capacitor 19 is connected between the respective emitters of the transistors 13 and 14. The driving or input voltage to the first differential amplifier is provided through a coupling capacitor 21 and the resistance 22.

The differentiating effect of the first differential amplifier 12–21 is produced by the capacitor 19 together with the input resistance $R_i$ of the transistor 13. The input resistance $R_i$ in a grounded base circuit which is formed of the circuit branch containing the transistor 13 is usually very small, for example 5 ohms. The first differential amplifier has a transmission function $du/dt = u/R_i$. With the value of 100 pF for the capacitor 19, there is therefore a cutoff frequency $f_c = 1/(2\pi \cdot R_i \cdot C) = 318$ MHz.

The second differentiating amplifier utilizing the transistors 23 and 24 is built the same way as the first differential amplifier. The circuit as a whole has the transmission function $d^2u/dt$, providing at the output 0/P of the second differential amplifier the twice differentiated signal.

Figure 5:
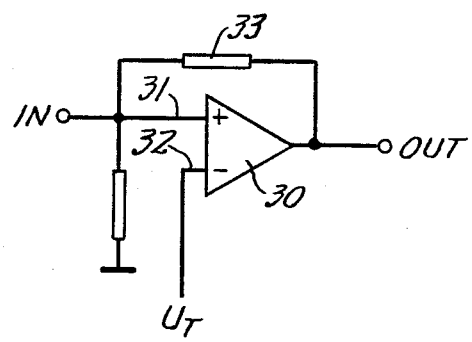
FIG. 5 is a circuit diagram of a comparator suitable for use in the circuit of FIG. 1.

FIG. 5 shows a comparator suitable for the circuit of FIG. 1. An operational amplifier 30 has a noninverting input 31 connected to the signal input and an inverting input 32 connected to a threshold-setting voltage $U_T$ just sufficient to produce a zero or low level output until, and so long as, a signal at the noninverting input exceeds the predetermined threshold. A feedback resistor 33 promptly brings the output to a limiting value until the input signal at 31 falls back below the threshold, when the resistor 33 then assures prompt return to the low level output. By proper choice of input connections this circuit can produce rectangular pulses corresponding to positive-going or negative-going crossing of thresholds.

Although the invention has been described with reference to particular illustrative embodiments, it will be understood that variations and modifications are possible within the inventive concept.

What is claimed is:

1. A system for processing signals in a digital recording and reproducing apparatus in which a digital signal written on a magnetic carrier is reconverted, in reproduction operation of the apparatus, into a digital signal, comprising:
   means for twice differentiating a said signal (d) read out from said carrier (2) to obtain a second derivative signal (c);
   a first comparator switch (5) for detecting positive components (b) of said second derivative signal (c) having an output and providing a detected positive component signal at the output of said first comparator switch;
   a second comparator switch (6) for detecting negative components (e) of said second derivative signal (c) having an output and providing a detected negative component signal at the output of said second comparator;
   and OR gate (7) having a first input connected to the output of said first comparator switch and a second input connected to the output of said second comparator switch, and also having an output;
   a D-flipflop (8) having a clock input connected to the output of said OR gate (7), a D input connected to the output of only one of said comparator switches and an output (Q) connected to an output (9) of the system for directly supplying a digital signal freed of distortion for further processing.

2. A system according to claim 1, wherein said D input of said D-flipflop (8) is connected to the output of said first comparator switch (5).

3. A system for processing signals in a digital recording and reproducing apparatus in which a digital signal written on a magnetic carrier is reconverted, in reproduction operation of the apparatus, into a digital signal, comprising:
   means for twice differentiating a said signal (d) read out from said carrier (2) and having an output for supplying a second derivative signal (c);

a full wave rectifier (10) connected for rectifying said second derivative signal (c) obtained from said differentiating means (4) and for producing at an output a substantially unfiltered full-wave rectified signal (h);

an addition circuit having an output and having inputs respectively connected to the output of said differentiating means (4) and to the output of said full wave rectifier (10), for adding said second derivative signal (c) to said rectified signal (h) to produce at said output a sum signal (i), and a D-flipflop (8) having a clock input connected to said full wave rectifier (10) and a D input connected to said output of said addition circuit (11) providing said sum signal (i) and having an output (9) at which digital signals freed of distortion are made available for further processing.

* * * * *